United States Patent
King

(10) Patent No.: US 9,364,806 B2
(45) Date of Patent: Jun. 14, 2016

(54) BOTTLE MIXER

(71) Applicant: Shenique M King, Hallandale Beach, FL (US)

(72) Inventor: Shenique M King, Hallandale Beach, FL (US)

(*) Notice: Subject to any disclaimer, the term of this patent is extended or adjusted under 35 U.S.C. 154(b) by 110 days.

(21) Appl. No.: 14/106,743

(22) Filed: Dec. 14, 2013

(65) Prior Publication Data

US 2015/0165402 A1    Jun. 18, 2015

(51) Int. Cl.
| | |
|---|---|
| *B01F 7/00* | (2006.01) |
| *B01F 15/06* | (2006.01) |
| *B01F 15/00* | (2006.01) |
| *A47J 43/046* | (2006.01) |
| *A47J 36/24* | (2006.01) |

(52) U.S. Cl.
CPC ....... *B01F 15/00409* (2013.01); *A47J 36/2411* (2013.01); *A47J 43/046* (2013.01); *B01F 15/00006* (2013.01); *B01F 15/00175* (2013.01); *B01F 15/00396* (2013.01); *B01F 15/00519* (2013.01); *B01F 15/066* (2013.01); *B01F 2015/062* (2013.01); *B01F 2215/0014* (2013.01)

(58) Field of Classification Search
CPC .... A47J 43/046; A47J 43/036; A47J 36/2411
USPC .............................. 366/314, 205, 145; 99/483
See application file for complete search history.

(56) References Cited

U.S. PATENT DOCUMENTS

| | | | |
|---|---|---|---|
| 2,700,097 A | 1/1955 | Morey | |
| 2,920,875 A | 1/1960 | Marfuggi | |
| 3,704,864 A | 12/1972 | Lee | |
| 4,487,509 A * | 12/1984 | Boyce | 366/314 |
| 4,889,248 A * | 12/1989 | Bennett | 366/205 |
| 5,639,161 A | 6/1997 | Sirianni | |
| 5,720,552 A | 2/1998 | Schindlegger | |
| 5,797,313 A * | 8/1998 | Rothley | 99/483 |
| 5,970,847 A | 10/1999 | Saltzman | |
| 6,639,186 B1 * | 10/2003 | Perez | 219/387 |
| 7,066,640 B2 | 6/2006 | Sands | |
| 7,314,307 B2 | 1/2008 | Cai | |
| 7,878,701 B2 | 2/2011 | Stephens | |
| 2005/0105387 A1 | 5/2005 | Nikkhah | |
| 2008/0225636 A1* | 9/2008 | Kolar | 366/206 |
| 2008/0251063 A1 | 10/2008 | Palena | |
| 2011/0024537 A1 | 2/2011 | Gonzalez | |
| 2013/0200064 A1 | 8/2013 | Alexander | |

* cited by examiner

*Primary Examiner* — Tony G Soohoo
*Assistant Examiner* — Anshu Bhatia
(74) *Attorney, Agent, or Firm* — Christopher J. Vandam, PA; Chris Vandam

(57) ABSTRACT

A bottle mixer including a housing that contains a motor, a battery, a controller, controls, and a thermometer all operatively connected to a controller. Threads are provided on a top side of the housing that are adapted to connect to a standard baby bottle. The motor inside the housing is connected to a blade outside the housing that protrudes into attached baby bottle. Selecting a first control spins the blade inside the bottle for a predetermined time. Selecting the second control spins the blade until a predetermined temperature of the bottle contents is reached.

6 Claims, 2 Drawing Sheets

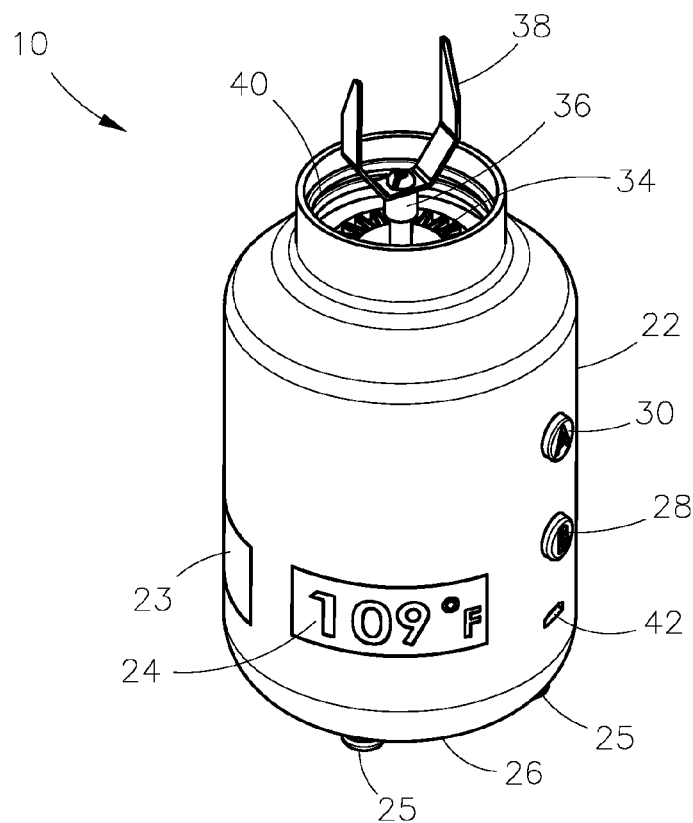
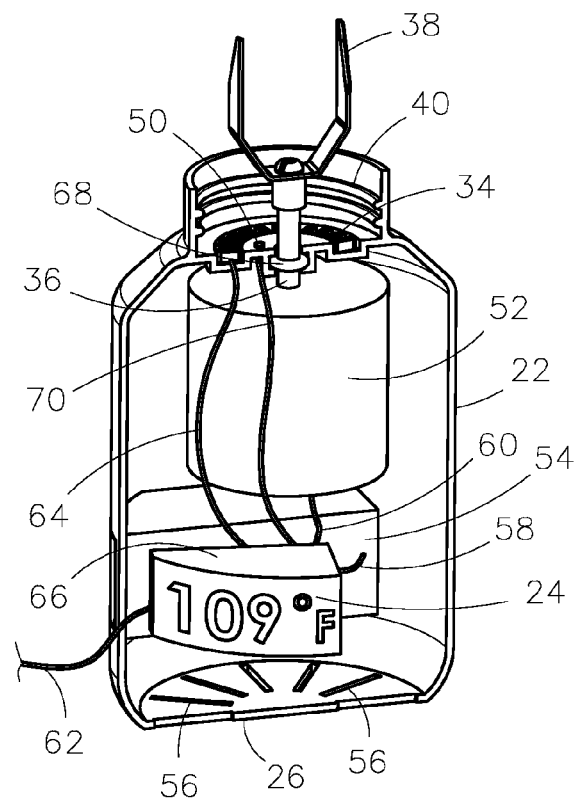

BOTTLE MIXER

BACKGROUND OF THE INVENTION

1. Field of the Invention

The present invention relates to baby feeding bottles, and more particularly, to a device used with a bottle to mix and/or heat the contents prior to use.

2. Description of the Related Art

Several designs for mixers have been designed in the past. None of them includes, among other features, a portable device with a mixer and optional heater that is compatible with standard baby bottles.

Applicant believes that the closest reference corresponds to U.S. patent publication No. 2011/0024537 filed by Gonzalez. However, it differs from the present invention because the Gonzalez device requires a proprietary bottle to be used with a bottle blender which limits the usefulness and increases the costs involved with using the device in typical conditions.

Other inventions to mix containers and bottles include an array of agitators inserted into the bottle and devices similar to a traditional blender that require a custom built vessel or pitcher to contain the materials being mixed.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device that can be used with any standard baby bottle.

It is another object of this invention to provides a semi-automatic operating mode that can be used with one hand so the other hand remains free to assist the child being fed.

It is still another object of the present invention to provide a mixer that precisely mixes and heats the contents to a predetermined point while providing positive visual temperature measurements.

It is another object of this invention to provide a semi-automatic feature so that the mother can press a program button on the device and then not attend to the device until the program is completed.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 illustrates a perspective view of a bottle mixer.

FIG. 4 is a representation of perspective view of a partial cross-section of a bottle mixer.

DETAILED DESCRIPTION OF THE PREFERRED EMBODIMENT

Figure 1:
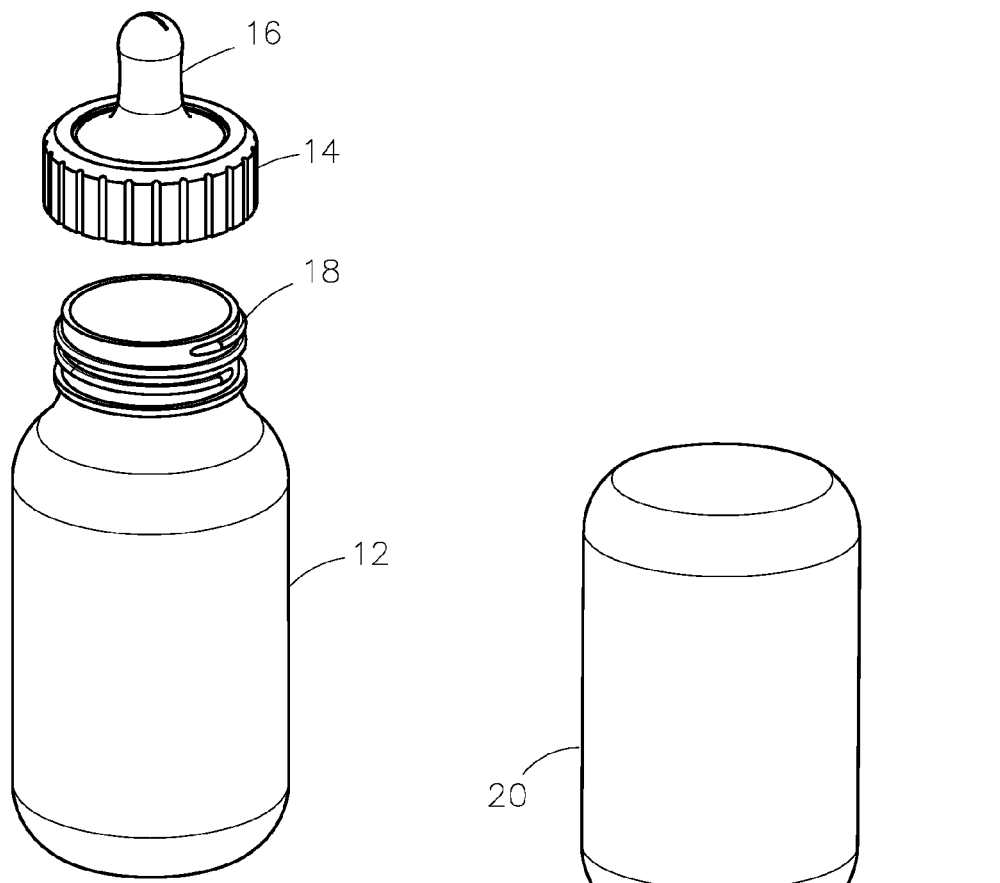
FIG. 1 represents an exploded perspective view of a prior art bottle with a nipple assembly.

Referring now to the drawings, where the prior art is shown in figure one to include, inter alia, a bottle 12, a retainer 14, a nipple 16 and a neck 18. The nipple 16 and retainer 14 are combined into a nipple assembly. This is a commonly available baby bottle that is relatively inexpensive that is available in materials such as plastic or glass. Most nursing mothers have several bottles and nipple assemblies similar to this design that are used to feed the nursing baby.

Although the term "mother" is used in this description, it is intended to mean anyone who is using a bottle blender in relation to feeding a baby. Obviously, the gender is not determinative of this capacity and is used illustratively and as a term of convenience.

Generally, the bottle 12 is a vessel with a closed bottom that is particularly suited to contain milk, baby formula and other similar fluids. Commonly, threads are formed integral to the neck 18 that are adapted to connect to internal threads on the retainer 14. By this means the nipple assembly is connected water-tight to the bottle 12.

In typical use of the bottle as shown in figure one, the mother would introduce warmed liquid to the bottle. Depending on the nature of the feeding regimen, a supplement, medication, powdered formula or liquid formula may then be added. Some users of this type of device will fill the bottle 12 first and then warm the bottle and contents prior to use feeding the baby.

The warming procedure is often done with the use of a household microwave or in a pan of warmed water on the stove. Obviously, this requires the mentioned appliance and the kitchen with power supply. This is inherently not portable or convenient outside of the home or otherwise away from the kitchen.

Further, the traditional methods of heating the bottle as described supra must be done shortly before feeding of the contents to the baby otherwise the bottle contents will be allowed to cool. These methods of heating the contents of the bottle are inherently imprecise and can easily overheat or under-heat the contents.

Figure 2:
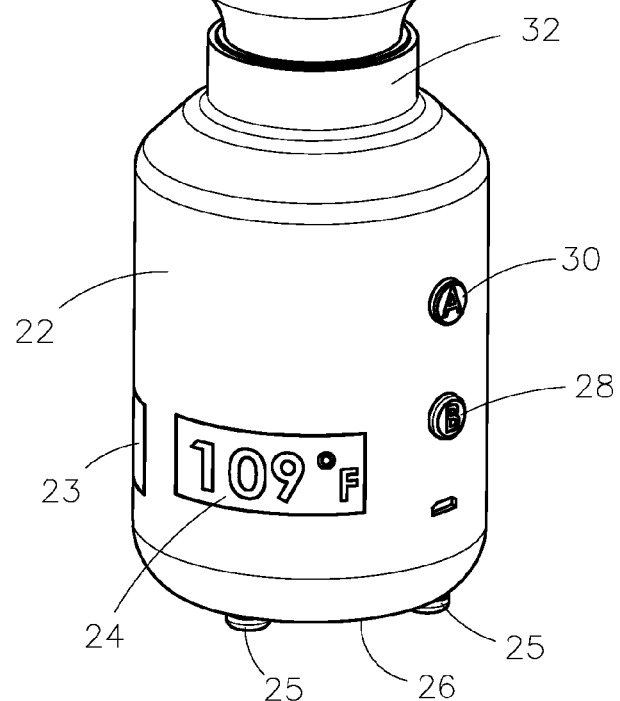
FIG. 2 shows a perspective view of a bottle connected to a bottle mixer as it might be in actual use.

Now referring to figures two and three where a bottle mixer is shown. In FIG. 2 the bottle mixer is demonstrated with a bottle 20 attached. Bottle 20 is similar to bottle 12 in figure one. In these figures the bottle mixer can be observed to include a bottle 20, a housing 22, a battery door 23, a display 24, feet 25, a bottom 26, a control 28, a control 30, a flange 32, a heater 34, a shaft 36, blades 38, threads 40 and a port 42.

The housing 22 is the base structure onto which the other elements are attached. The housing 22 can be made of a rigid and cleanable material, for example, plastic, aluminum, stainless or other material that household appliances are made from.

The flange 32 has threads 40, or other available attachment means, to connect the bottle 20 to the housing 22. The connection between the bottle and flange 32 should be watertight and easy to connect and disconnect the bottle 20 to the flange 32. The bottle 20 is typically an off the shelf bottle commonly available from many suppliers and has standardized threads on the neck similar to the threads shown on the neck 18 in prior art example shown in figure one.

In typical use, when connecting a bottle mixer to a bottle, the bottle will have at least a liquid component, such as milk, water or formula. Because of this, the bottle would be held with the threads on the upper side to contain the liquid, and the bottle mixer would be held inverted (compared to the image in figure three) and can thus be threaded onto the bottle tightly and avoiding any spillage.

Then, prior to mixing, the then connected bottle and bottle mixer are re-oriented as shown in figure two with the bottle 20 above the bottle mixer. This configuration with the aid of gravity pulls the contents of the bottle into contact with the blades 38.

With a filled (or in most cases partially filled) bottle 20 attached to a bottle blender the mother can then immediately or at a point later in time decide to operate the basic functions of a bottle blender.

It is anticipated that in some cases, the mother will bring several bottles in her baby care bag for use while outside of the home. The bottles may be better protected when unconnected to the bottle blender and sealed with a cap or nipple assembly. A bottle mixer may be dimensioned, weighted and otherwise adapted for use in a baby gear bag. Preferably, it would be suitable for transport with other baby and mother necessities, such as diapers, wipes and other such items.

Generally, immediately prior to use, the bottle is connected to a bottle mixer. The mother then can select a function of the bottle mixer by depressing a provided button. In the example in the drawings, control 28 could initiate a mixing sequence or control. 30 could be used to start a mixing and warming protocol. Either of the controls 28 or 30 can take the form of a button, switch, lever or other similar means with which the mother interacts to operate the bottle mixer.

Continuing this example, the mixing sequence could be timed period where the blades 38 are rotated inside the attached bottle 20. This could be a few seconds to a few minutes or longer. In many cases about a minute or so would be effective to mix the contents of the bottle thoroughly. The control initiating the mixing could be re-pressed to start another period of mixing if the mother so desires.

Another operation on a bottle blender is the control 30 that could be used to start a simultaneous warm and mix program. When the mother wants to warm and mix the bottle at the same time this would provide a convenient option. The device can be pre-programmed with a safe and effective time of blend combined with the intensity of heat. Alternatively, the heat could be applied during a mixing and when a target temperature of the contained liquid is reached, then the operation could conclude at that point.

Depending on the type and means of introducing heat to the contents of bottle 20, it could be preferred to only apply heat while the blades 38 are rotating so that the contents are evenly heated and the risk of scalding the contents is minimized.

The heater 34 may be used to increase the temperature of the contents of the bottle 20. In the example shown in the figure three, the heater may be a resistive element such as nichrome (NiCr) sealed in a protective and sanitary housing. Alternatively many other common types of heating elements could be effectively used such as metal, ceramic composite or a combination of more than one type of heating means. The heating could be achieved by any of a variety of available means but is preferably controllable, energy efficient, durable, economical and safe for this application.

A display 24 may be optionally provided to provide cues to the mother as to the present temperature of the bottle contents, battery status, time remaining on blend cycle, connectivity status, current time, time until the next scheduled feeding or other relevant and desired information about the bottle mixer or its operations.

Feet 25 are optionally provided on the bottom 26 of the housing 22. The feet 25 can help the bottle mixer be more stable, particularly while the device is in operation. This could be a safety issue if the bottle mixer would shimmy or vibrate near the baby while mixing. The feet 25 can also provide improved, airflow around the bottom 26 of the device for drying or dissipating heat generated by the device. The feet 25 may be a supple, rubbery substance adhered to the bottom 26 of the housing 22 or may be integrally formed to the housing 22.

A bottle mixer will be powered by a portable supply, such as a battery. Other available means that are compact may also be suitable such as plugged to alternating or direct current, solar, inductive or other such types. In a version of the bottle mixer a rechargeable battery is used. A battery door 23 is optionally provided to permit access to the battery for replacement or maintenance. In other versions, a battery will be fixed inside the housing 22 and would not be accessible, except by a specified technician.

A port 42 may also be optionally provided. The port 42 may provide a means for connectivity to an external computer or power supply. For example, the port 42 may take the form of a USB (universal serial bus) connector that is commonly used to charge devices such as cell phones. Of course the example of USB should not be understood as limiting to only this style of connector but is a fair example of an effective choice. As time progresses other effective styles could equally be employed with similar results.

The port 42 could also be a simple power connector for supplying power from wall current, a car's 12 volt accessory port or other external power supply. This could be used to power the device during operation or to re-charge a contained battery.

The port 42 could also provide a data access point for the device. Again using USB as a mere example of a variety of effective cabling form factors, the port 42 could connect to a computer. This could be used to power the device from that computer's power supply. It could also allow the mother to alter the preprogrammed parameters of the mixing or heating with mixing cycles.

By allowing access to the programs the mother can increase or decrease the target temperature of the contained fluid or alter the time limit on an automatic mixing cycle. Similarly, a diagnostic program could evaluate the performance of the hardware or battery to determine whether maintenance is required.

Figure four shows a partial cross section of a bottle mixer, similar to that shown in figure three. This view further includes, among other things, a thermometer 50, a motor 52, a battery 54, vents 56, wire 58, wire 60, wire 62, wire 64, controller 66, seal 68 and wire 70.

This example of interior components of a bottle mixer shows that the controller 66 is at the heart of the system. The controller 66 connects to the battery 54 with wire 60 and the motor 52 with wire 58. The controller 66 also interfaces with the display 74 directly connected onto the controller 66. The heater 34 is controlled, by the controller 66 with wires 64. A thermometer 50 is optionally connected to the controller 66 with wire 70. Due to the nature of figure four being cross-sectional, the controls 28 and 30 are not seen but wire 62 is provided to interconnect controls 28 and 30 to the controller 66.

The thermometer 50 is used for sensing the temperature of the contents of the bottle during a warming plus mixing function. When the prescribed temperature is hit then that cycle can end. It may be preferable to mix for a short period after the heater 34 stops warming to equalize the temperature.

The motor 52 is provided to generate the rotational force onto the blades 38 that perform the primary mixing feature. A seal 68 is provided between the blades 38 and the interior of the housing 22 to prevent liquid intrusion into the housing and thereby protecting those moisture sensitive components. The seal 68 can also provide a bearing surface of a shaft connecting the motor 52 to the blades 38.

Vents 56 are optionally provided on the bottom 26 surface of the housing 22. The vents 56 can aid in the dissipation of heat built up on the interior of the housing 22 and can also help dry out any accumulated moisture on the inside as well.

Some commercially baby bottles may have varying thread and neck styles and dimensions. As an optional feature or accessory an adapter ring may be provided. The adapter ring (not shown in the figures) can be threaded between the bottle and the bottle mixer. This allows the device to made fit for a common size baby bottle and yet remain functional with alternate sizes. This may also be a useful feature for international markets where standard sizes can vary from one region to another region throughout the world.

A bottle mixer can be fairly described as being comprised of a housing containing, among other features, an electric motor, a battery, a thermometer or other temperature measuring device, an alpha numeric or high resolution display, a first control (or button, switch or similar means to activate the device), a second control (possibly similar in form to the first control), a port (powered and with or without a data link capability) and a heater, each operatively connected to a controller. The controller is a form of computer processor with power management features to facilitate operations of the device. The controller may be able to run a timed program for mixing, variably control the heating element, monitor the temperature in the baby formula being mixed, control battery management tasks and other features beneficial to the efficient and safe operation of a bottle mixer. The top side of the housing has a first thread adapted to connect to a second thread on a baby bottle forming a watertight seal between the baby bottle and the top side of the housing. A bearing or sleeve on the motor shaft in the top surface of the bottle mixer is between the blade on the top side of the mixer and the motor on the inside of the housing that forms a seal to keep liquid and moisture inside the baby bottle and out of the housing. The baby bottle used with the bottle mixer will general have an interior volume that holds baby formula, milk or other liquid based combinations that are to be fed to a baby. The motor is affixed inside the housing and is operably connected to a blade above the top side of the housing. The motor turns the blade when the controller supplies it power. The blade could be direct on the motor shaft or could be geared to supply adequate speed and torque. The blade is positioned at a predetermined distance inside the baby bottle when the baby bottle is connected to the top side of the housing so that the blade is in contact with the liquid contents of the bottle during a mixing operation. During a mixing operation the threads of the bottle are on the bottom side of the bottle and the corresponding threads of the bottle mixer are on the top side of the bottle mixer. This brings the liquid inside the bottle into contact with the blade for mixing. The heater and thermometer are exposed to the interior volume of the baby bottle so that they can heat and measure, respectively, the liquid in the baby bottle. The display displays a first information or multiple pieces of information about the device. The port is adapted to accept an external power source for powering the operation of the bottle mixer and/or recharging the battery contained inside the housing. Operating the first control (i.e. pressing the button) initiates a first program in the controller that activates the motor to rotate the blade for predetermined period of time. This is blend only cycle. Operating the second control initiates a second program in the controller that activates the motor to rotate the blade and to heat the heater until the thermometer detects a predetermined temperature. This is a heat and mix cycle.

A bottle mixer could fairly further be characterized in that the first information is a temperature of a fluid contained in the interior volume of the baby bottle, the time left on the mixing cycle (mixing may be sometime referred to as blending). The battery (or batteries) can be rechargeable or replaceable. The port connects the controller to an external computing source like a phone or computer and that external computing source can amend a program in the controller. This could change, for example, the preset times and temperatures that occur when pressing the operational controls. It could also be used for diagnostics or other maintenance. The port can optionally connect the controller to an external computing source where the external computing source can amend the predetermined period of time or the predetermined temperature as mentioned above. The external power source can recharge the battery and can provide sufficient power to operate the bottle mixer with or without the battery or can recharge the battery. Adapter rings may be provided that fit onto the first thread so that the second thread, if a different size, will allow the baby bottle to securely fit onto the bottle mixer.

The foregoing description conveys the best understanding of the Objectives and advantages of the present invention. Different embodiments may be made of the inventive concept of this invention. It is to be understood that all matter disclosed herein is to be interpreted merely as illustrative, and not in a limiting sense.

What is claimed is:

1. A bottle mixer comprised of: a housing containing a motor, a battery, a thermometer, a thermostat, a display, a first control, a second control, a port, a standard baby bottle and a heater, each operatively connected to a controller; the baby bottle is comprised of a liquid tight container having an opening with an external thread; a top side of the housing has a first thread adapted to connect to the external thread on the baby bottle forming a watertight seal between the baby bottle and the top side of the housing exterior to the housing; the baby bottle has an interior volume; the motor is affixed inside the housing and is operably connected to a blade above and permanently connected to the top side of the housing; the blade is positioned at a predetermined distance inside the baby bottle through the opening when the baby bottle is connected to the top side of the housing; the heater and thermometer are in the interior volume of the baby bottle and are in direct contact with a contained fluid; the display displays an actual temperature of the contained fluid while the blades are moving; the port is adapted to accept an external power source; operating the first control initiates a first program in the controller that immediately activates the motor to rotate the blade for predetermined period of time; operating the second control initiates a second program in the controller that activates the motor to rotate the blade and to heat the contained fluid until the thermometer detects a predetermined temperature.

2. The bottle mixer as described in claim 1 further characterized in that the battery is rechargeable.

3. The bottle mixer as described in claim 1 further characterized in that the port connects the controller to an external computing source;
  the external computing source can amend a program in the controller.

4. The bottle mixer as described in claim 1 further characterized in that the external power source can recharge the battery and can provide sufficient power to operate the bottle mixer with or without the battery.

5. The bottle mixer as described in claim 1 further characterized in that the external power source can recharge the battery.

6. The bottle mixer as described in claim 1 further characterized in that a threaded adapter is provided that fits between the first thread and the second thread when the first thread and second thread are not directly compatible.

* * * * *